(12) United States Patent
Kourous-Harrigan et al.

(10) Patent No.: US 12,148,296 B2
(45) Date of Patent: Nov. 19, 2024

(54) SENSOR OPTIMIZATION

(71) Applicant: Ford Global Technologies, LLC, Dearborn, MI (US)

(72) Inventors: Helen E. Kourous-Harrigan, Monroe, MI (US); William Thomas Buller, Dexter, MI (US); Jeremy Graham, Chelsea, MI (US); Susan Janiszewski, Superior Township, MI (US); Colin Brooks, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 268 days.

(21) Appl. No.: 17/518,773

(22) Filed: Nov. 4, 2021

(65) Prior Publication Data

US 2023/0138084 A1    May 4, 2023

(51) Int. Cl.
*G08G 1/048*   (2006.01)
*B60W 10/18*   (2012.01)
(Continued)

(52) U.S. Cl.
CPC ............ *G08G 1/048* (2013.01); *B60W 10/18* (2013.01); *B60W 10/20* (2013.01); *B60W 40/04* (2013.01); *G06T 17/05* (2013.01); *G06V 20/58* (2022.01); *G08G 1/0116* (2013.01); *H04N 23/90* (2023.01); *B60W 2556/45* (2020.02); *G06T 2210/12* (2013.01); *G08G 1/012* (2013.01); *G08G 1/0129* (2013.01)

(58) Field of Classification Search
None
See application file for complete search history.

(56) References Cited

U.S. PATENT DOCUMENTS 10,743,198 B1    8/2020   Park
10,992,752 B2    4/2021   Graefe et al.
(Continued)

FOREIGN PATENT DOCUMENTS

EP    3311604 B1    3/2019

OTHER PUBLICATIONS

Galceran, E., Olson, E., & Eustice, R. M. (Sep. 2015). Augmented vehicle tracking under occlusions for decision-making in autonomous driving. In 2015 IEEE/RSJ International Conference on Intelligent Robots and Systems (IROS) (pp. 3559-3565).

*Primary Examiner* — Peter D Nolan
*Assistant Examiner* — Michael F Whalen
(74) *Attorney, Agent, or Firm* — Frank A. MacKenzie; Bejin Bieneman PLC

(57) ABSTRACT

A three-dimensional grid model of a traffic scene can be determined based on grid elements. Weights can be determined for the grid elements of the three-dimensional grid model corresponding to priority regions and occluded grid elements. Grid coverage for respective stationary sensors can be determined based on the grid elements of the three-dimensional grid model. A matrix can be determined based on the grid coverage of the plurality of stationary sensors. An optimal subset of stationary sensors can be determined based on applying a greedy search algorithm to the matrix, the weights and costs corresponding to the plurality of stationary sensors to maximize the ratio of grid coverage to the cost based on poses of the plurality of stationary sensors.

20 Claims, 10 Drawing Sheets

(51) Int. Cl.
  *B60W 10/20*    (2006.01)
  *B60W 40/04*    (2006.01)
  *G06T 17/05*    (2011.01)
  *G06V 20/58*    (2022.01)
  *G08G 1/01*     (2006.01)
  *H04N 23/90*    (2023.01)

(56) References Cited

U.S. PATENT DOCUMENTS

| | | | |
|---|---|---|---|
| 2003/0058342 A1* | 3/2003 | Trajkovic | G08B 21/0476 |
| | | | 348/E7.086 |
| 2019/0222652 A1* | 7/2019 | Graefe | H04L 67/12 |
| 2020/0304726 A1 | 9/2020 | Karaoguz et al. | |
| 2021/0294944 A1* | 9/2021 | Nassar | B60W 50/00 |

* cited by examiner

SENSOR OPTIMIZATION

BACKGROUND

Data can be acquired by sensors and processed using a computer to determine data regarding objects in an environment. Operation of a sensing system can include acquiring accurate and timely data regarding objects in the environment of the system. A computer can acquire data, i.e., images, lidar point clouds or radar range data from one or more sensors that can be processed to determine locations of objects. Object location data extracted from sensor data can be used by a computer to operate systems including vehicles, robots, security, and object tracking systems.

DETAILED DESCRIPTION

Figure 1:
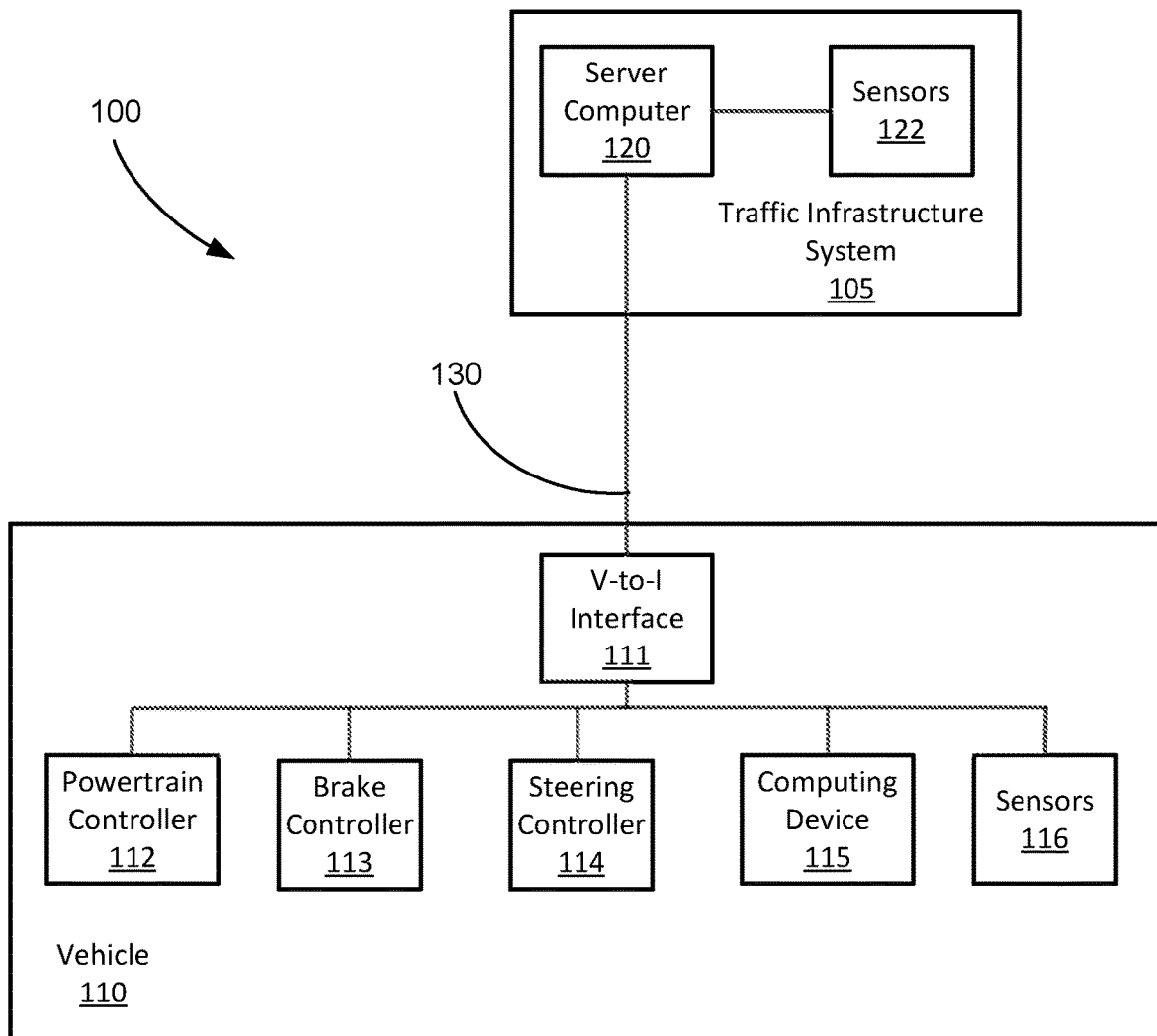
FIG. 1 is a block diagram of an example traffic infrastructure system.

A sensing system can acquire data, for example image data, regarding an environment around the system and process the data to determine identities and/or locations of objects. For example, a deep neural network (DNN) can be trained and then used to determine objects in image data acquired by sensors in systems including vehicle guidance, robot operation, security, manufacturing, and product tracking. Vehicle guidance can include operation of vehicles in autonomous or semi-autonomous modes in environments that include a plurality of objects. Robot guidance can include guiding a robot end effector, for example a gripper, to pick up a part and orient the part for assembly in an environment that includes a plurality of parts. Security systems include features where a computer acquires video data from a camera observing a secure area to provide access to authorized users and detect unauthorized entry in an environment that includes a plurality of users. In a manufacturing system, a DNN can determine the location and orientation of one or more parts in an environment that includes a plurality of parts. In a product tracking system, a deep neural network can determine a location and orientation of one or more packages in an environment that includes a plurality of packages.

Vehicle guidance will be described herein as a non-limiting example of using a computer to detect objects, for example vehicles and pedestrians, in a traffic scene and determine a vehicle path for operating a vehicle based on the detected objects. A traffic scene is an environment around a traffic infrastructure system or a vehicle that can include a portion of a roadway and objects including vehicles and pedestrians, etc. For example, a computing device in a traffic infrastructure system can be programmed to acquire one or more images from one or more sensors included in the traffic infrastructure system, detect objects in the images and communicate labels that identify the objects along with locations of the objects. The sensors can include video or still image cameras that acquire images corresponding to visible or infrared wavelengths of light. The sensors can be stationary and can be mounted on poles, buildings, or other structures to give the sensors a view of the traffic scene including objects in the traffic scene. Sensors can also include lidar sensors, which typically emit infrared wavelengths of light, radar sensors which emit radio waves, and ultrasound sensors which emit sound waves. Lidar, radar, and ultrasound sensors all measure distances to points in the environment.

In some examples stationary sensors included in a traffic infrastructure system can acquire one or more images of a traffic scene and communicate the image data along with data describing a location and orientation of the stationary sensor to a vehicle included in the traffic scene. A computing device included in the vehicle can determine real-world coordinates of objects included in the image data and determine a vehicle path based on the detected objects. Objects determined in image data downloaded from a traffic infrastructure system can be determined in addition to objects determined based on sensors included in a vehicle. Stationary sensors included in a traffic infrastructure system can acquire image data that includes portions of the traffic scene not currently in view of sensors included in a vehicle. For example, portions of the traffic scene can be occluded from view of the vehicle by other vehicles, i.e., traffic, occluded by buildings or foliage, i.e., around corners or terrain, such as hills or valleys, or far enough away to be out of the range of sensors included in the vehicle. Stationary sensors included in a traffic infrastructure system can be mounted on poles, buildings, or other structures to provide an overview of a traffic scene and provide image data to vehicles that includes portions of the traffic scene that is not currently in the field of view of sensors included in the vehicle.

The ability to provide stationary sensor data to vehicles from a traffic infrastructure system can be improved by determining an optimal arrangement of stationary sensors by maximizing the coverage of a plurality of stationary sensors, where coverage is the percentage of roadway area of a traffic scene included in the stationary sensor's fields of view while minimizing the stationary sensor cost, i.e., minimizing the number of stationary sensors required to provide the maximum coverage. Optimal arrangement of stationary sensors is based on the combined fields of view of the stationary sensors. A field of view of a stationary sensor is determined by the location and orientation of the stationary sensor. The location of a stationary sensor includes height and is measured with respect to x, y, and z orthogonal axes. Orientation of the stationary sensor is described in terms of roll, pitch, and yaw rotations about orthogonal x, y, and z location axes, respectively.

The computation of an optimal arrangement of stationary sensors can be improved by determining the optimal arrangement using a greedy search algorithm, advantageously avoiding exhaustive and computationally expensive search techniques which require that coverage for every possible permutation of stationary sensor be determined and compared to determine the solution that yields the most coverage using the fewest stationary sensors. Computation of an optimal arrangement of stationary sensors can optionally include stationary sensor cost, including costs corresponding to mounting the stationary sensors. Including stationary sensor costs can permit tradeoff studies that balance stationary sensor coverage with overall system costs. A greedy search algorithm can find solutions for subsets of stationary sensor configurations and that can then be combined to determine an optimal solution. The optimal solution provides coverage for areas of the roadway that have been indicated as requiring coverage by increasing weights assigned to the areas while minimizing the number of stationary sensors required to cover the weighted areas. While the optimal solution determined by techniques discussed herein may not be exactly equal to an optimum solution determined by exhaustive search, the optimal solution can be proven to be arbitrarily close to an optimum solution while being achieved in much less time using far fewer computer resources.

The traffic scene can be described as a grid model, which is a map divided into contiguous grid elements that correspond to respective small (<1 meter squared) portions of the traffic scene. The grid elements can be weighted to correspond to a probability that the grid element would be occluded from view of vehicle sensors by traffic, buildings or foliage, terrain, or distance. The grid elements can also be weighted to correspond to a probability that they would be occupied by objects of interest such as pedestrians or vehicles. Techniques discussed herein can determine an optimal arrangement of stationary sensors based on a weighted grid model of a traffic scene by maximizing a coverage to cost ratio corresponding to the number of stationary sensors required to achieve the coverage. By basing the coverage on a weighted grid model, the greedy search model achieves an optimal solution that is arbitrarily close an optimum solution in far less time using far fewer computer resources than an optimum solution that relies on exhaustive search techniques.

Disclosed herein is a method, including determining a three-dimensional grid model of a traffic scene based on grid elements, determining weights for the grid elements of the three-dimensional grid model corresponding to priority regions and occluded grid elements and determining grid coverage for respective ones of a plurality of stationary sensors based on the grid elements of the three-dimensional grid model. A matrix can be determined based on the grid coverage of the plurality of stationary sensors and an optimal subset of stationary sensors can be determined based on applying a greedy search algorithm to the matrix, the weights, and the plurality of stationary sensors to maximize a ratio of the grid coverage to a number of stationary sensors based on poses of the plurality stationary sensors. The three-dimensional grid model can be determined by dividing a map that includes the traffic scene into a rectangular array of contiguous grid elements and determining an elevation for respective ones of the grid elements. The elevations can be determined based on one or more of satellite lidar data or airborne lidar data. The occluded grid elements can be determined by simulating fields of view based on simulated sensors included in a simulated vehicle as the simulated vehicle travels through a simulated traffic scene that includes simulated traffic. The occluded grid elements can be determined based on the simulated traffic corresponding to typical traffic observed at one or more different times of day. The priority regions can include one or more of a pedestrian walkway, a loading zone, and a bus stop.

The plurality of stationary sensors can be respectively mounted on one or more of a pole, a building, or a structure such that fields of view of the plurality of stationary sensors include portions of the traffic scene. The grid coverage for respective ones of the plurality of stationary sensors can be based on viewshed analysis from the respective stationary sensors to the grid elements of the three-dimensional grid model. The matrix can include a K×N incidence matrix that includes K rows corresponding to K stationary sensor configurations and N columns corresponding to the grid elements included in the grid coverage of the respective K stationary sensor configurations. The greedy search can maximize an objective function $$\max_k \left( \sum_n^N M_{kn} \right)$$

over the K stationary sensor configurations to determine the optimal subset of stationary sensors. The objective function $M_{kn}=B_{kn}\odot(C_k \otimes W_n)$, wherein $B_{kn}$ can be the incidence matrix, $C_k$ can be a K×1 cost matrix, $W_n$ can be the weights applied to respective grid elements, $\odot$ can be a Hadamard product, and $\otimes$ can be an outer product. Stationary sensor data from the optimal subset of stationary sensors can be downloaded to a second computer included in a vehicle. The stationary sensor data can include metadata such as bounding boxes based on objects included in the stationary sensor data. A vehicle path can be determined based on the sensor data.

Further disclosed is a computer readable medium, storing program instructions for executing some or all of the above method steps. Further disclosed is a computer programmed for executing some or all of the above method steps, including a computer apparatus, programmed to determine a three-dimensional grid model of a traffic scene based on grid elements, determine weights for the grid elements of the three-dimensional grid model corresponding to priority regions and occluded grid elements and determine grid coverage for respective ones of a plurality of stationary sensors based on the grid elements of the three-dimensional grid model. A matrix can be determined based on the grid coverage of the plurality of stationary sensors and an optimal subset of stationary sensors can be determined based on applying a greedy search algorithm to the matrix, the weights, and the plurality of stationary sensors to maximize a ratio of the grid coverage to a number of stationary sensors based on poses of the plurality of stationary sensors. The three-dimensional grid model can be determined by dividing a map that includes the traffic scene into a rectangular array of contiguous grid elements and determining an elevation for respective ones of the grid elements. The elevations can be determined based on one or more of satellite lidar data or airborne lidar data. The occluded grid elements can be determined by simulating fields of view based on simulated sensors included in a simulated vehicle as the simulated vehicle travels through a simulated traffic scene that includes simulated traffic. The occluded grid elements can be determined based on the simulated traffic corresponding to typical traffic observed at one or more different times of day. The priority regions can include one or more of a pedestrian walkway, a loading zone, and a bus stop.

The instructions can include further instructions to mount the plurality of stationary sensors respectively on one or more of a pole, a building, or a structure such that fields of view of the plurality of stationary sensors include portions of the traffic scene. The grid coverage for respective ones of the plurality of stationary sensors can be based on viewshed analysis from the respective stationary sensors to the grid elements of the three-dimensional grid model. The matrix can include a K×N incidence matrix that includes K rows corresponding to K stationary sensor configurations and N columns corresponding to the grid elements included in the grid coverage of the respective K stationary sensor configurations. The greedy search can maximize an objective function $$\max_k \left( \sum_{n}^{N} M_{kn} \right)$$

over the K stationary sensor configurations to determine the optimal subset of stationary sensors. The objective function $M_{kn} = B_{kn} \odot (C_k \otimes W_n)$, wherein $B_{kn}$ can be the incidence matrix, $C_k$ can be a K×1 cost matrix, $W_n$ can be the weights applied to respective grid elements, $\odot$ can be a Hadamard product, and $\otimes$ can be an outer product. Stationary sensor data from the optimal subset of stationary sensors can be downloaded to a second computer included in a vehicle. The stationary sensor data can include metadata such as bounding boxes based on objects included in the stationary sensor data. A vehicle path can be determined based on the sensor data.

FIG. 1 is a diagram of a sensing system 100 that can include a traffic infrastructure system 105 that includes a server computer 120 and stationary sensors 122. Sensing system 100 includes a vehicle 110. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120 via a network 130, which, as described below, includes hardware, firmware, and software that permits computing device 115 to communicate with a remote server computer 120 via a network 130 such as wireless Internet (WI-FI®)) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Vehicles 110 can be equipped to operate in both autonomous and occupant piloted mode. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or more of vehicle propulsion, braking, and steering. In a non-autonomous mode, none of these are controlled by a computer.

Figure 2:
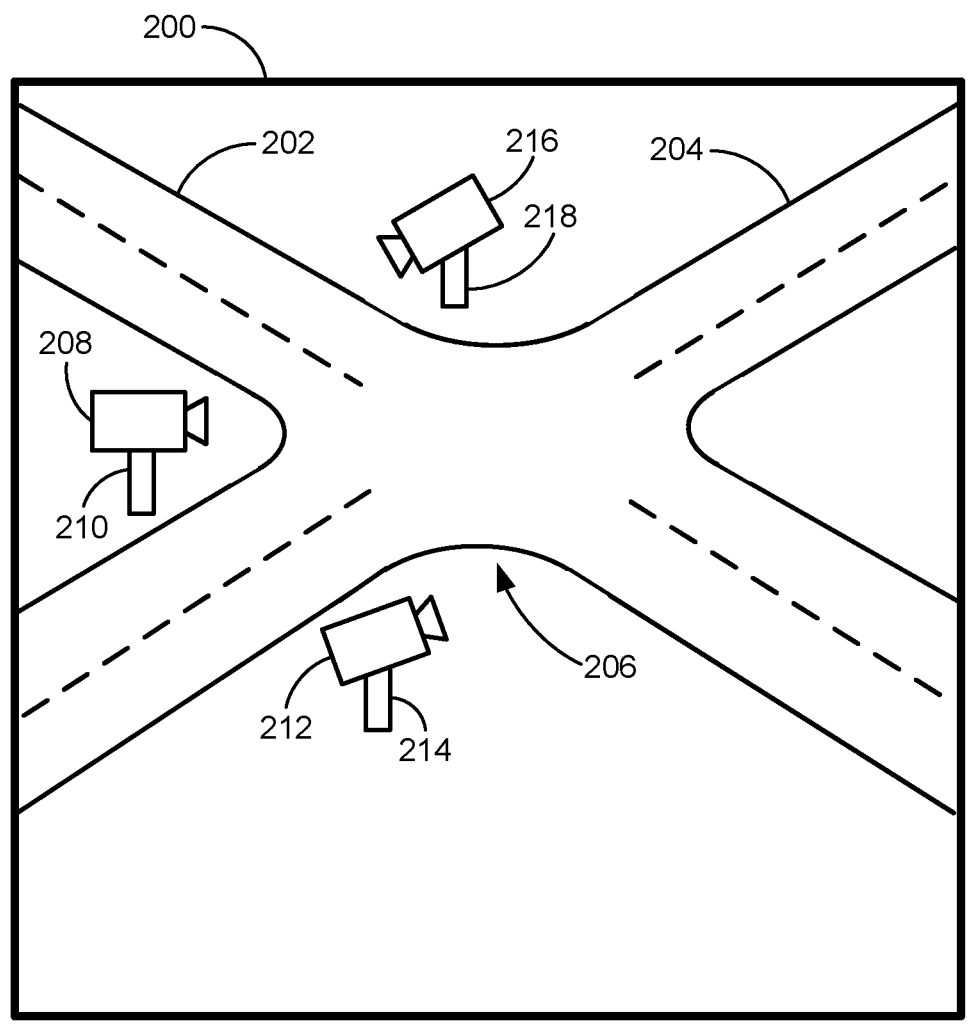
FIG. 2 is a diagram of an example image of a traffic scene.

FIG. 2 is a diagram of a traffic scene 200. Traffic scene 200 includes roadways 202, 204 that meet at an intersection 206. Vehicles 110 operating in autonomous or semi-autonomous mode as discussed above in relation to FIG. 1, above, can be assisted in operating on roadways 202, 204 by stationary sensors 122 included in a traffic infrastructure system 105. Stationary sensor 122 can include cameras 208, 212, 216. Other types of stationary sensors 122 can include lidar, radar, or ultrasound, for example. Cameras 208, 212, 216 can be mounted on camera mounts 210, 214, 218. Camera mounts 210, 214, 218 can include traffic signal poles, light poles, purpose-built poles or mounts, buildings, or existing structures such as bridges, overpasses, or sign poles.

Figure 3:
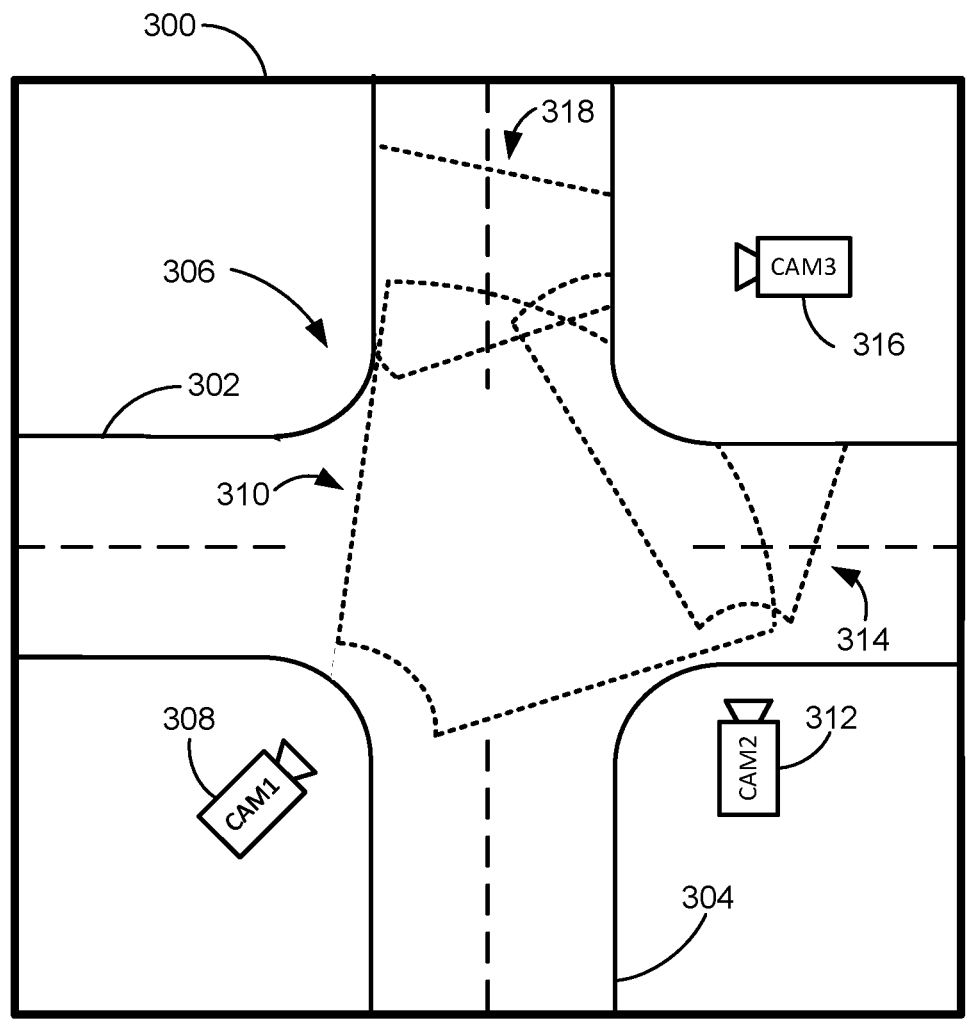
FIG. 3 is a diagram of an example traffic scene including fields of view.

FIG. 3 is an overhead view of a traffic scene 300 including roadways 302, 304 and an intersection 306. Traffic scene 300 includes three cameras 308, 312, 316, having respective fields of view (shown by the dotted lines) 310, 314, 318 that includes portions of roadways 302, 304 and the intersection 306. The fields of view 310, 314, 318 of the respective cameras 308, 312, 316 are a function of the location and orientation of the cameras 308, 312, 316. The location can be expressed in an x, y, and z coordinate system based on latitude, longitude and altitude, for example. Orientation can be expressed as roll, pitch, and yaw rotations about the x, y, and z coordinate axes, respectively. Combining location and orientation specifies the six degree of freedom (DoF) pose of a stationary sensor. Fields of view 310, 314, 318 of the cameras 308, 312, 316 are also functions of intrinsic parameters of the cameras 308, 312, 316. Intrinsic parameters of a camera 308, 312, 316 are values that describe a configuration or configurations of the camera 308, 312, 316 and that thereby govern the mapping of real-world locations to pixel coordinates in images acquired by cameras 308, 312, 316. Intrinsic parameters can include, for example, focal length, distance from an optical center of the camera lens to a sensor plane, the scale or size of image pixels, and/or lens distortion. Combining the location and orientation of a camera 308, 312, 316 with respect to a traffic scene 300 and the respective intrinsic parameters of the cameras 308, 312, 316, respectively can determine the portions of the roadways 302, 304 and an intersection 306 included in the fields of view 310, 314, 318 of the cameras 308, 312, 316.

Figure 4:
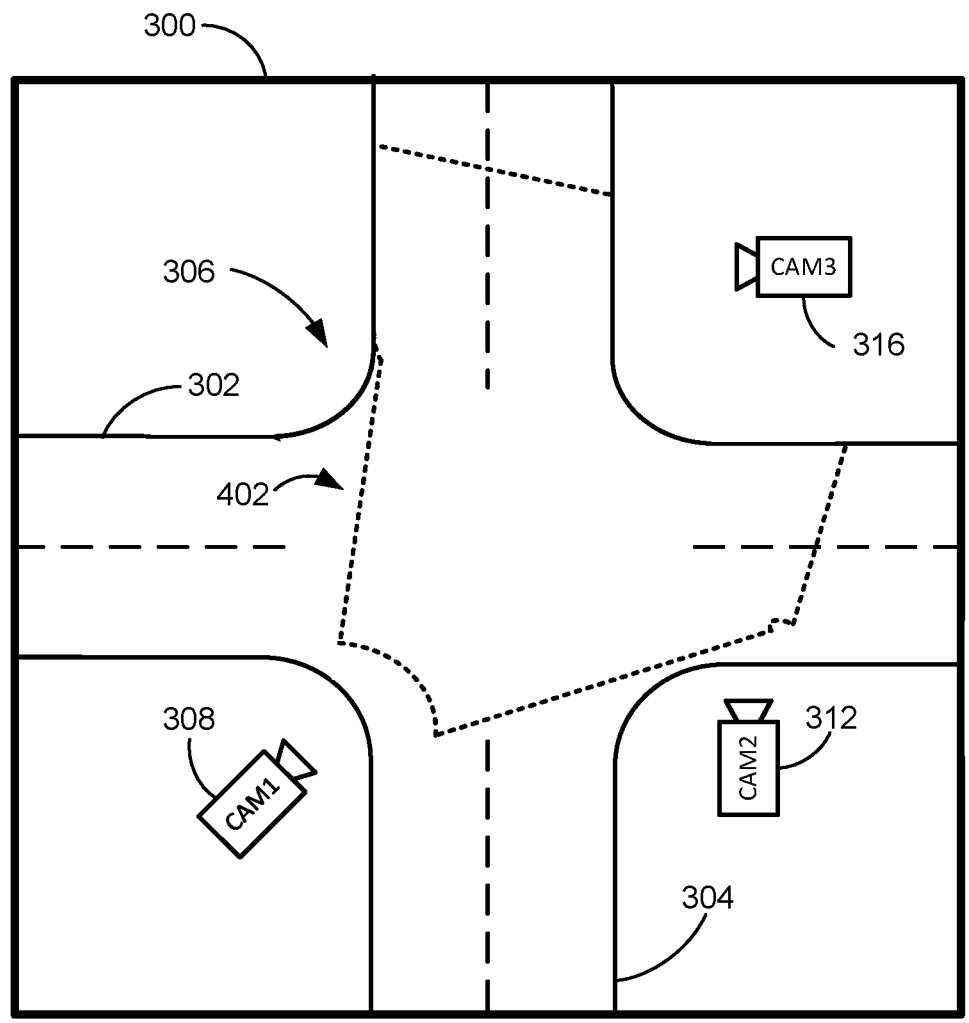
FIG. 4 is a diagram of an example traffic scene including combined fields of view.

FIG. 4 is a diagram of traffic scene 300 including roadways 302, 304 and an intersection 306. Traffic scene 300 includes a combined field of view (dotted lines) 402 corresponding to fields of view 310, 314, 318 of cameras 308, 312, 316. Combined field of view 402 corresponds to the coverage of roadways 302, 304 and intersection 306 that cameras 308, 312, 316 provide in traffic scene 300. Coverage can be determined by measuring the percentage of roadway 302, 304 and intersection 306 surface area included in the combined field of view 402. For example, in traffic scene 300 combined field of view 402 corresponds to a coverage of about 50%, i.e., the area of combined field of view 402 is approximately 50% of the combined area of roadways 302, 304 and intersection 306.

Figure 5:
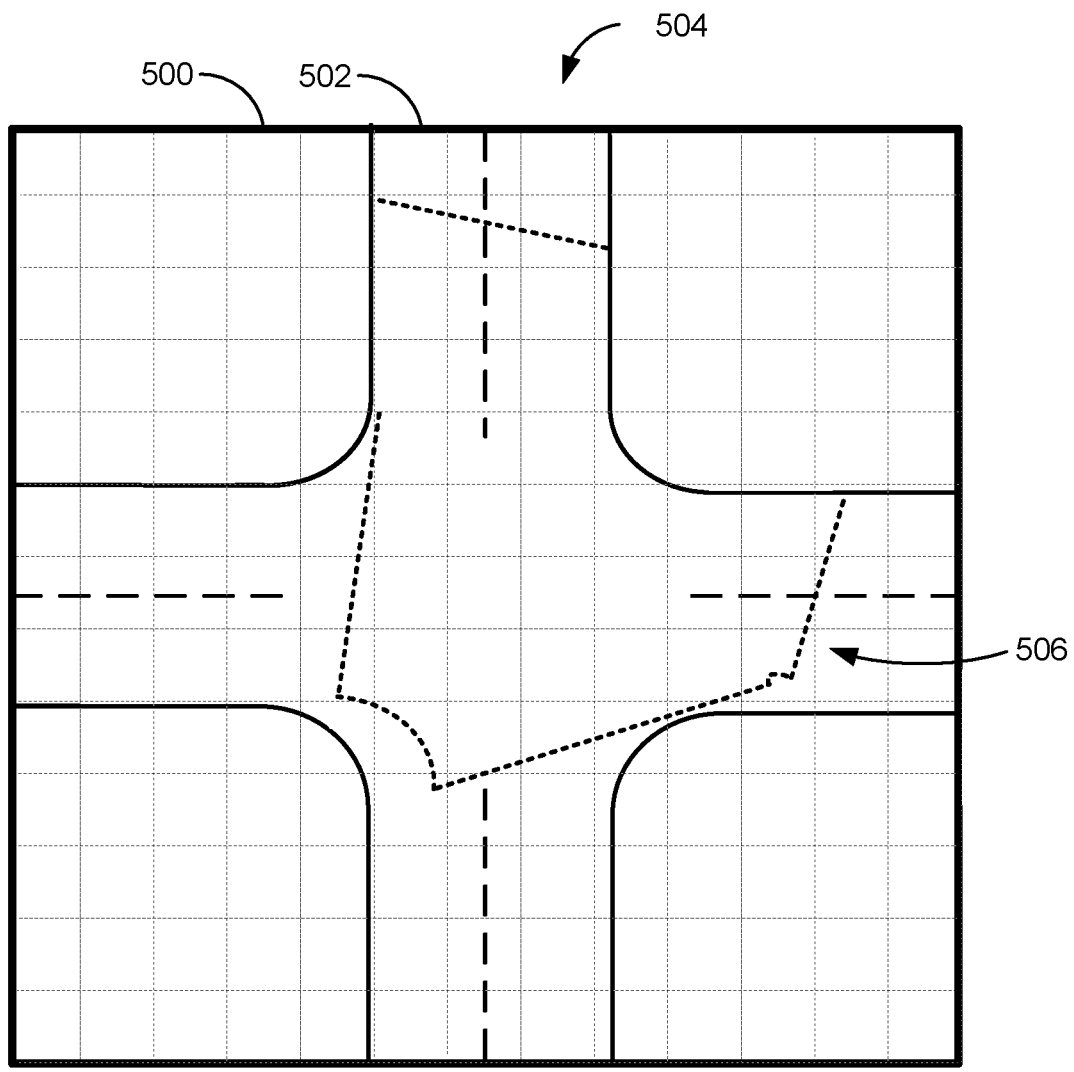
FIG. 5 is a diagram of an example traffic scene including grid elements.

FIG. 5 is a diagram of a three-dimensional (3D) grid model 502 of a traffic scene 500. A 3D grid model 502 is a set of map data where the map data corresponding to a traffic scene 500 is overlaid with a rectangular array of contiguous grid elements 504. Respective grid elements 504 represent respective portions or sub-areas of the grid model 502 of the traffic scene 500 and can typically be less than 1 meter square and cover the traffic scene 500 with addressable grid element 504 locations (e.g., x, y coordinates could be specified based on a grid origin at a lower left corner of the grid model 502). All calculations on the 3D grid model 502 are performed to the nearest grid element 504. Grid coverage is the number of grid cells in the fields of view of one or more stationary sensors 122. For example, grid coverage of a combined field of view (dotted lines) 506 can be determined by adding the number of complete and partial grid elements 504 included in the combined field of view 506 of the three cameras 308, 312, 316.

Figure 6:
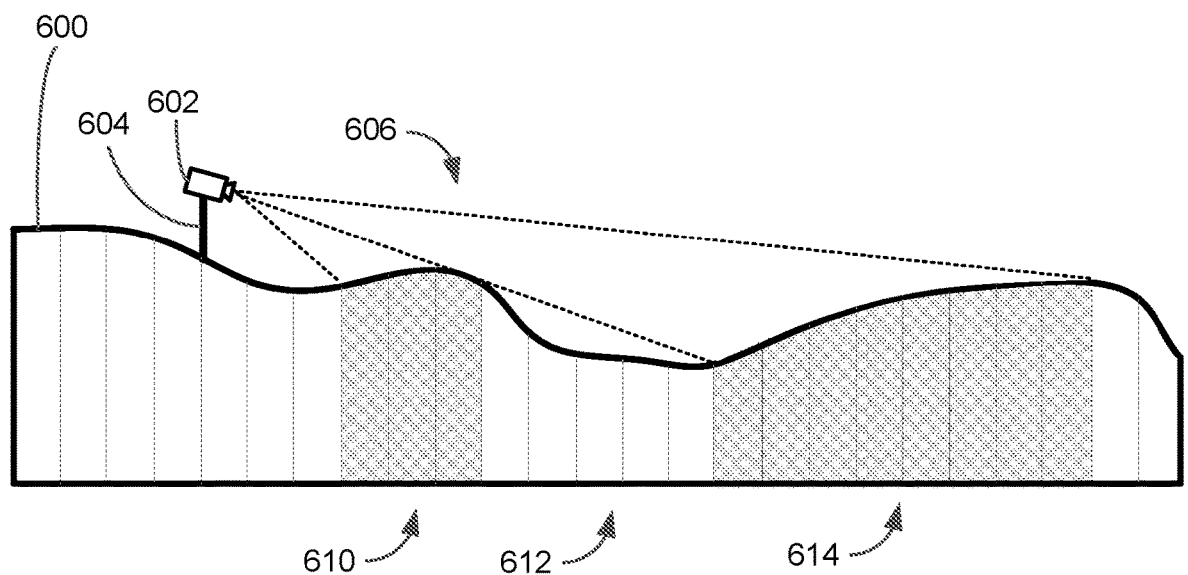
FIG. 6 is a diagram of an example side view of a grid model.

Digital elevation data can be combined with a grid model 502 to form a 3D grid model 600 (FIG. 6). Digital elevation data can be obtained from satellite lidar data or airborne lidar data and combined with map data to generate a 3D grid model of a traffic scene. The lidar and map data can be adjusted based on sensor data acquired in the real world corresponding to the 3D grid model. In this fashion the resolution of the 3D grid model can be improved in all three dimensions.

Techniques discussed herein typically determine grid coverage based on computer simulations of grid models 502 that include simulations of cameras having simulated fields of view. This permits a plurality of different configurations of cameras at a plurality of locations and orientations to be tested and compared to determine optimal configurations before installing cameras in a traffic scene. In examples where one or more cameras are already installed, the existing cameras can be included in the simulated data to compare the existing installation with possible new configurations. Techniques discussed herein can improve installation of stationary cameras in a traffic infrastructure system by simulating coverage for a plurality of possible installations and determining a subset of potential camera locations and orientations that provides the maximum coverage at a minimal cost.

FIG. 6 is a diagram of a cross-sectional view of a 3D grid model 600. FIG. 6 illustrates how a 3D grid model can be used to improve determination of grid coverage corresponding to a stationary sensor 122, in this example a camera 602, mounted on a pole 604 having a field of view (dotted lines) 606 based on elevation data. Grid coverage is the set of grid elements visible from one or more stationary sensor 122 included in a traffic infrastructure system 105. Grid coverage can be determined based on determining a stationary sensor 122 "viewshed." A viewshed of a sensor 122 is the portion grid elements of a 3D grid model visible from a stationary sensor 122 located at point in space.

The grid elements visible to a stationary sensor 122 are a function of viewing parameters including the x, y, and z coordinates of the 3D location of the stationary sensor 122, the horizontal (x-axis) field of view, the vertical (y-axis) field of view, the minimum distance visible to the stationary sensor 122, the maximum distance visible to the stationary sensor 122 and the orientation of the stationary sensor 122 in roll, pitch, and yaw rotations. Grid coverage can be computed by inputting a raster version of the digital elevation model and geodetic, i.e., land survey, coordinates to a viewshed analysis tool, currently implemented using the Geospatial Data Abstraction Library (GDAL) viewshed algorithm. GDAL is described in Wang, J., Robinson, G. J., & White, K., "Generating viewsheds without using sightlines," Photogrammetric engineering and remote sensing, 66(1), 2000 pp 87-90. The viewshed analysis returns a matrix that represents the visibility of grid elements from the location of the stationary sensor 122. The output from the viewshed analysis can be constrained to the field of view for any specified sensor. The viewshed analysis matrix can be used to generate a library of possible configurations for the stationary sensors 122 including pose. The library of possible configurations for the stationary sensors 122 including pose become rows of the matrix M described below in relation to FIG. 8.

Figure 7:
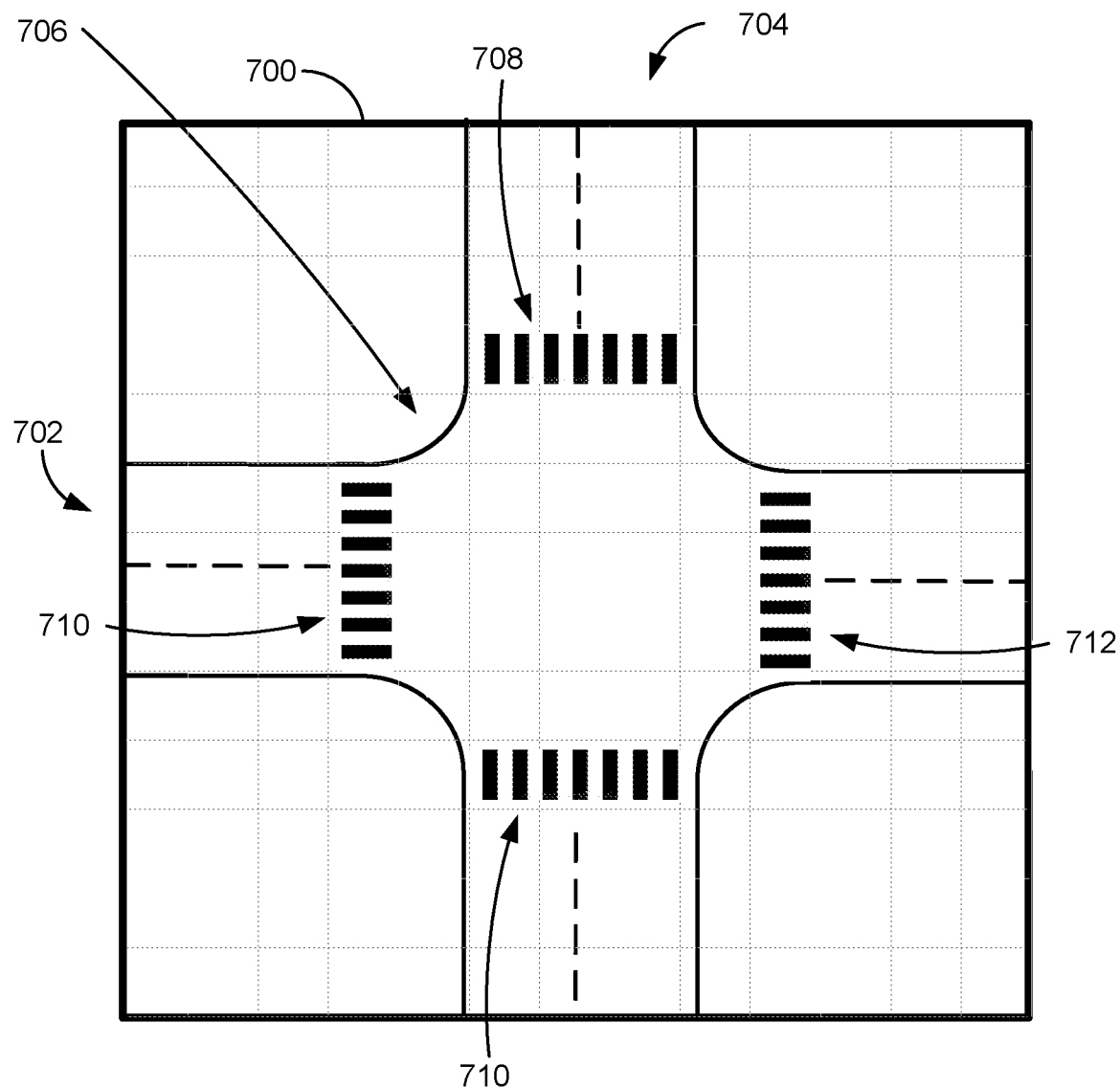
FIG. 7 is a diagram of an example grid model including priority areas.

FIG. 7 is a diagram of a grid model 700 of a traffic scene including roadways 702, 704 that form an intersection 706. Grid model 700 includes pedestrian walkways 708, 710, 712, 714. When determining grid coverage for a grid model 700, not all grid elements have equal importance. Weighting can be applied to grid elements in a grid model 700 to increase the priority of the grid elements. Data regarding accidents or near misses can be used to increase weighting of grid elements. Other data that can be used to increase weighting of grid elements includes locations of pedestrian walkways 708, 710, 712, 714, loading zones or bus stops, etc. Weighting grid elements based on increased priority can be used to encourage overlap between stationary sensor 122. For example, increasing weighting of grid elements that include pedestrian walkways can encourage solutions which result in a lidar sensor being located to provide coverage of all four pedestrian walkways 708, 710, 712, 714 and camera coverage overlapping the lidar.

Figure 8:
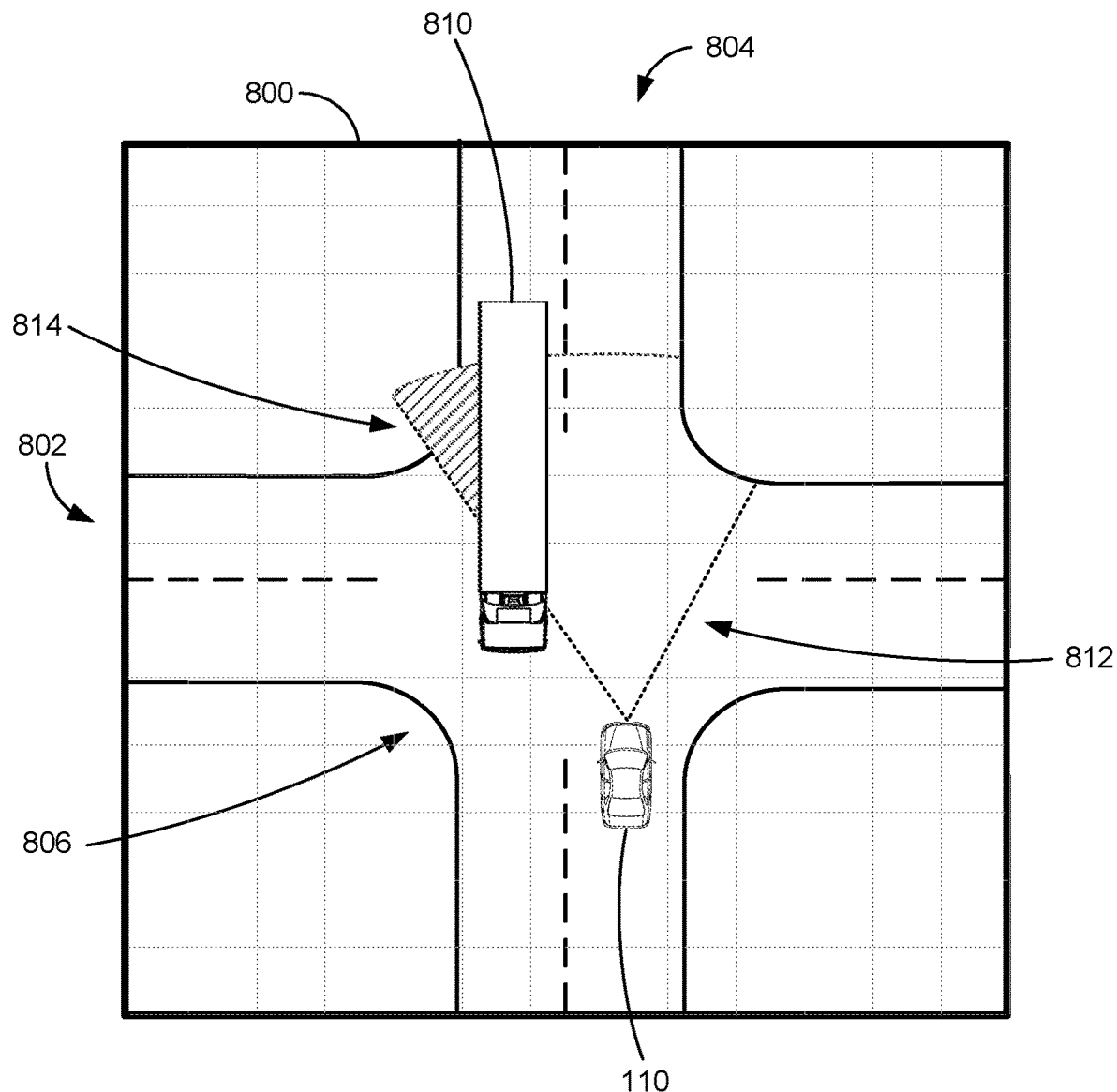
FIG. 8 is a diagram of an example grid model including occluded areas.

FIG. 8 is a diagram of a grid model 800 of a simulated traffic scene including roadways 802, 804 and an intersection 806. Grid model 800 illustrates a result of a dynamic simulation (i.e., simulating motion of vehicle(s) 110 and other objects in the grid model 800 over time) that includes a simulated vehicle operating in the grid model 800 while simulated traffic, including a simulated truck 810 also operates in the grid model 800. A dynamic simulation includes simulated motion of the simulated vehicles included in the simulation, where the grid elements occupied by the simulated vehicles are determined at a plurality of time steps as the simulated vehicle travels through the simulated traffic scene. Simulated vehicle includes a simulated sensor having a simulated field of view (dotted lines) 812. The simulated field of view 812 includes a portion that is occluded (diagonal fill) 814. An occluded 814 portion of simulated field of view 812 is a portion that is not visible to the simulated vehicle because of an intervening object such as a simulated truck 810. Grid elements that are occluded 814 can be weighted to increase the probability that a simulated stationary sensor that includes coverage of the occluded 814 grid elements will be included in the optimal set of stationary sensors 122 selected by techniques discussed herein.

A plurality of dynamic simulations including vehicles 110 operating on respective vehicle paths on various roadways 802, 804 of a grid model 800 can be executed. A plurality of traffic models can include a plurality of simulated vehicles and simulated pedestrians corresponding to typical traffic patterns that can be observed at a plurality of times a day. The plurality of traffic models can be included in a plurality of dynamic simulations. For example, traffic, including the number of vehicles, will be greater at some times of the day, i.e. rush hours, than others. Executing a plurality of dynamic simulations and summing the resulting occluded 814 grid elements can determine weights to be applied to the grid elements of a grid model 800. Summing the occluded grid elements over a plurality of simulations increase the probability that stationary sensors 122 will be selected that include grid coverage of occluded 814 grid elements.

An optimal arrangement of stationary sensor 122 included in a traffic infrastructure system 105 for a traffic scene 500 can be determined. A 3D grid model 500 for a traffic scene 500 can be determined including a plurality of stationary sensor 122 configurations. The stationary sensor 122 configurations can be simulated in a computer simulation of a 3D grid model 500, for example. The simulated stationary sensor 122 configurations can be user selected and include a plurality of stationary sensor 122 at a plurality of poses with respect to the 3D grid model 500. A stationary sensor 122 includes a sensor type, which can be camera, lidar, radar, or ultrasound, for example. Respective stationary sensors 122 include sensor intrinsic parameters as discussed in relation to FIG. 3, above. The stationary sensor 122 configurations can be combined with the 3D grid model as described in FIGS. 3-6 to determine grid coverages for respective stationary sensors 122 in the plurality of stationary sensor 122 configurations including stationary sensor pose.

Pose of a stationary sensor is limited by practical considerations. For example, the height of a stationary sensor is limited by cost, i.e., mounting poles become more expensive as height is increased, and resolution of the stationary sensors. A stationary sensor has an intrinsic resolution determined by the intrinsic parameters of the sensor. To be useful for traffic infrastructure tasks as discussed herein, a sufficient number of data points such as pixels per unit area should be available at a roadway level. For example, a single camera mounted high on a building can have a field of view that covers a large portion of a traffic scene, however, the resolution of the camera can be such that individual vehicles cannot be resolved in the image data acquired by the camera, making the sensor data unusable for traffic infrastructure purposes. Selecting the plurality of stationary sensors including poses to be optimized includes constraints on stationary sensor pose based on cost and sensor resolution. Given a selection of stationary sensors including pose and weights to salient regions of the road surface or adjoining regions to reflect importance based on a priori information regarding high-risk portions such as blind corners, pedestrian crosswalks, or loading zones, one or more optimal subsets of stationary sensor poses can be determined that maximizes sensor coverage while minimizing overall system cost.

Weights for priority grid elements for the 3D grid model can be user selected based on existing data regarding accidents and near accidents and inspection of the 3D grid model to determine grid elements corresponding to pedestrian walkways, school bus stops, and other areas likely to be occupied by pedestrians, as discussed in relation to FIG. 7. Weights for occluded 814 grid elements can be determined for a plurality of traffic patterns by performing a plurality of dynamic simulations using simulated vehicles modeled at a plurality of times of day.

A matrix M can be determined that includes a row for respective ones of the K configurations of stationary sensor 122 and a column for respective ones of the N grid elements of the 3D grid model, where the matrix $M_{kn}$ is determined by the equation:

$$M_{kn} = B_{kn} \odot (C_k \otimes W_n) \quad (1)$$

Where k is the enumerated configuration of a stationary sensor 122, n is the enumerated grid elements in the traffic scene 500, $B_{kn}$ is a K×N incidence matrix that includes grid coverage data that connects the grid elements, indexed on n, to the set of K stationary sensor 122 configurations, indexed on k. $C_k$ is a K×1 matrix that includes the cost corresponding to a kth stationary sensor 122 as configured, and $W_n$ is the weighing corresponding to the n grid elements. $\odot$ denotes the Hadamard product and $\otimes$ denotes the outer product.

A greedy search algorithm is performed to determine a maximal ratio of grid coverage to cost corresponding to one configuration of sensors 112 by maximizing the objective function $\Sigma_n^N M_{kn}$:

$$\max_k \left( \Sigma_n^N M_{kn} \right) \quad (2)$$

A greedy search algorithm is used to maximize the objective function $\Sigma_n^N M_{kn}$ over K, the set of configurations of stationary sensor 122. Maximizing the objective function $\Sigma_n^N M_{kn}$ is a non-polynomial hard (NP-hard) problem, meaning that determining the maximum requires that all possible configurations of stationary sensors 122 covering all possible combinations of stationary sensor 122 locations and orientations be evaluated. A greedy search algorithm determines local maxima for subsets of the set of all configurations of stationary sensors 122 and retains the determined local maxima as part of the end solution. Greedy search algorithms do not necessarily find the true maximum solution but typically find a solution that approximates the true maximum solution in far fewer steps than would be required to find the true maximum solution. For example, a greedy search algorithm performed on an objective function with K=1000 and M=10,000 yields the same maximum ratio of grid coverage to cost as an exhaustive search that calculates all the possible solutions while requiring only 16% of the computing resources, i.e., computing time, as the exhaustive search.

Figure 9:
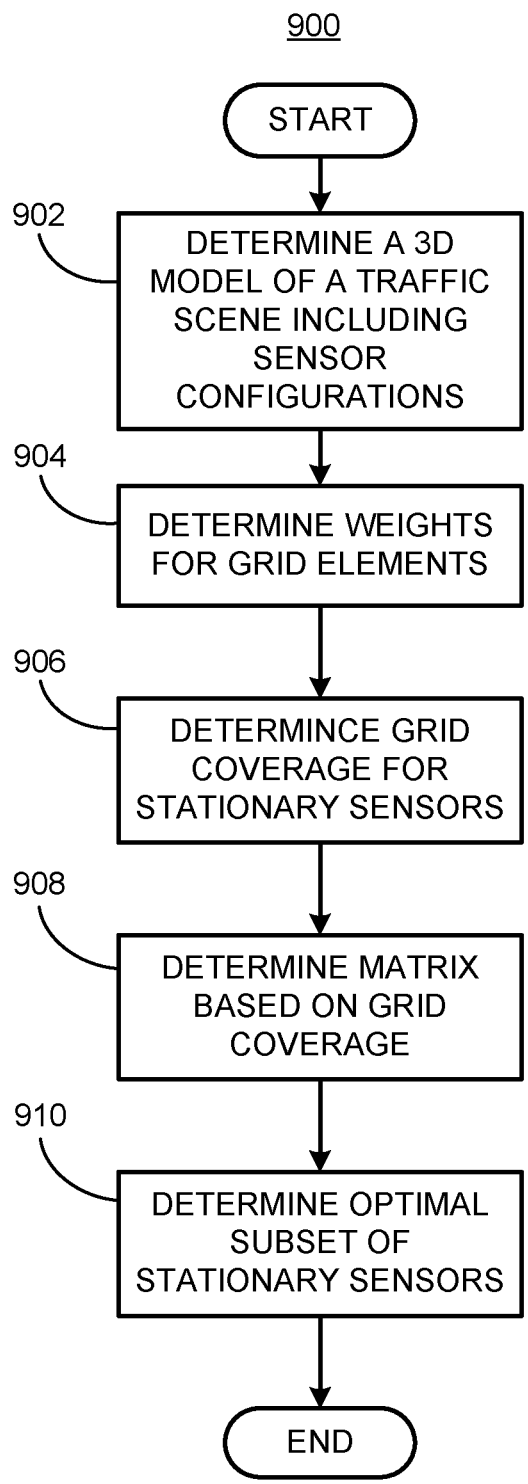
FIG. 9 is a flowchart diagram of an example process to determine an optimal subset of stationary sensors.

FIG. 9 is a diagram of a flowchart, described in relation to FIGS. 1-8, of a process for determining an optimal configuration of stationary sensors 122 in a traffic infrastructure system 105. Process 900 can be implemented by a processor of a server computer 120, taking as input data regarding stationary sensors 122, and executing commands, and outputting an optimal configuration of stationary sensors 122. Process 900 includes multiple blocks that can be executed in the illustrated order. Process 900 could alternatively or additionally include fewer blocks or can include the blocks executed in different orders.

Process 900 begins at block 902, where a server computer 120 determines a 3D grid model 500 of a traffic scene 500 as discussed above in relation to FIGS. 2-5. Included in the 3D grid model 500 is a plurality of stationary sensor 122 configurations for stationary sensor 122 included in a traffic infrastructure system 105. The stationary sensor 122 configurations can be simulated in a computer simulation of a 3D grid model 500. The simulated stationary sensor 122 configurations can include a plurality of stationary sensor 122 at a plurality of locations and orientations with respect to the 3D grid model 500. Stationary sensors 122 includes respective sensor types; a sensor type specifies a sensing medium and can be camera, lidar, radar, or ultrasound, for example. A stationary sensor 122 includes sensor intrinsic parameters as discussed in relation to FIG. 3, above and sensor costs for the sensor type, sensor location and sensor orientation included in the sensor configuration.

At block 904 the server computer 120 determines weights for grid elements 504 of the grid model 500. Weights are determined for grid elements 504 based on priority areas as discussed above in relation to FIG. 7 and occluded 814 areas as discussed above in relation to FIG. 8.

At block 906 server computer 120 determines grid coverage for respective sensor configurations based on a 3D grid model 500 as discussed in relation to FIG. 6, above.

At block 908 server computer 120 determines an objective function matrix $M_{kn}$ based on grid coverage data based on the set of stationary sensor 122 configurations, the cost corresponding to respective stationary sensors 122 as configured and the weights corresponding to respective ones of the grid elements as discussed above in relation to FIG. 8.

At block 910 server computer 120 determines an optimal subset of the stationary sensor 122 configurations by approximating the maximum ratio of stationary sensor 122 grid coverage to costs by performing a greedy search algorithm on the objective function matrix, summed over the stationary sensor 122 configurations and grid elements as discussed above in relation to FIG. 8. After block 910 process 900 ends.

Figure 10:
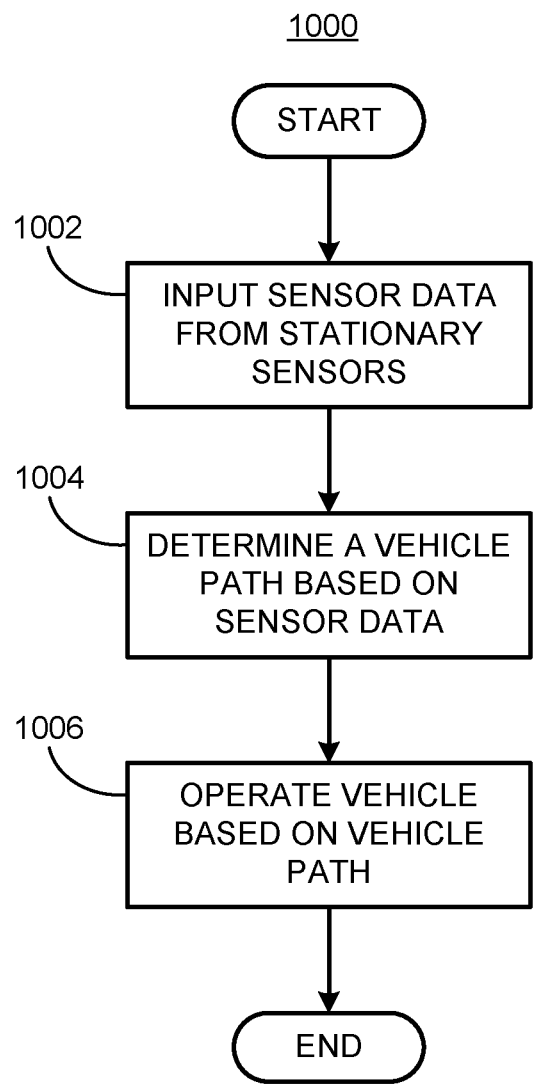
FIG. 10 is a flowchart diagram of an example process to operate a vehicle using an optimal subset of stationary sensors.

FIG. 10 is a diagram of a flowchart, described in relation to FIGS. 1-9, of a process for operating a vehicle 110 based on stationary sensor 122 data downloaded from a traffic infrastructure system 105. Process 1000 can be implemented by a processor of a computing device 115, taking as input data from server computer 120, and executing commands, and operating vehicle 110. Process 1000 includes multiple blocks that can be executed in the illustrated order. Process 1000 could alternatively or additionally include fewer blocks or can include the blocks executed in different orders.

Process 1000 begins at block 1002, where a computing device 115 in a vehicle 110 downloads stationary sensor 122 data from a server computer 120 included in a traffic infrastructure system 105. Downloaded stationary sensor 122 data can include metadata determined based on the stationary sensor 122 data such as bounding boxes based on objects located in the stationary sensor data 122. Metadata such as bounding boxes can be determined by a server computer 120 processing the stationary sensor 122 data using image processing software, for example deep neural networks. Downloaded stationary sensor 122 data can be used in addition to sensor 116 data acquired from sensors 116 included in a vehicle 110. Stationary sensor 122 data is acquired using stationary sensors 122 that have been optimized to maximize the ratio of stationary sensor 122 grid coverage to cost as discussed above in relation to FIGS. 8 and 9 including weighting the 3D grid model to increase weights for priority areas and occluded regions based on simulated traffic.

At block 1004 computing device 115 determines a vehicle path based on the stationary sensor 122 data and sensor 116 data. A vehicle path is a polynomial function that includes maximum and minimum lateral and longitudinal accelerations to be applied to vehicle motion as it travels along the vehicle path. Techniques described herein improve determination of the vehicle path by providing data regarding priority areas and potentially occluded areas of a traffic scene in addition to data provided by vehicle sensors 116.

At block 1006 computing device 115 outputs commands to controllers 112, 113, 114 to control vehicle powertrain, vehicle steering, and vehicle brakes to control vehicle motion to operate vehicle 110 along the vehicle path determined at block 1004. Following block 1006 process 1000 ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, *Julia*, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system comprising:
a first computer that includes a first processor and a first memory, the first memory including first instructions executable by the first processor to:
determine a three-dimensional grid model of a traffic scene based on grid elements;
determine occluded grid elements by simulating fields of view based on simulated sensors included in a simulated vehicle as the simulated vehicle travels through a simulated traffic scene that includes simulated traffic;

determine weights for the grid elements of the three-dimensional grid model corresponding to priority regions and occluded grid elements;

determine grid coverage for respective ones of a plurality of stationary sensors based on the grid elements of the three-dimensional grid model;

determine a matrix based on the grid coverage of the plurality of stationary sensors;

output an optimal subset of stationary sensors determined based on applying a greedy search algorithm to the matrix, the weights, and the plurality of stationary sensors to maximize a ratio of the grid coverage to a number of stationary sensors based on poses of the plurality of stationary sensors; and acquire one or more images of the traffic scene with the optimal subset of stationary sensors and communicate the image data along with data describing a location and orientation of the stationary sensor to a vehicle included in the traffic scene; and a second computer in a vehicle that includes a second processor and a second memory, the second memory including second instructions executable by the second processor to:

determine a path for the vehicle based on the one or more images of the traffic scene; and operate the vehicle on the vehicle path by controlling vehicle powertrain, vehicle steering, and vehicle brakes.

2. The system of claim 1, the first instructions including further instructions to determine the three-dimensional grid model by dividing a map that includes the traffic scene into a rectangular array of contiguous grid elements and determining an elevation for respective ones of the grid elements.

3. The system of claim 2, wherein the elevations are determined based on one or more of satellite lidar data or airborne lidar data.

4. The system of claim 1, the first instructions including further instructions to determine the occluded grid elements based on the simulated traffic corresponding to typical traffic observed at one or more different times of day.

5. The system of claim 1, wherein the priority regions include one or more of a pedestrian walkway, a loading zone, and a bus stop.

6. The system of claim 1, wherein the plurality of stationary sensors are respectively mounted on one or more of a pole, a building, or a structure such that fields of view of the plurality of stationary sensors include portions of the traffic scene.

7. The system of claim 1, the first instructions including further instructions to determine the grid coverage for respective ones of the plurality of stationary sensors based on viewshed analysis of the respective stationary sensors to the grid elements of the three-dimensional grid model.

8. The system of claim 1, wherein the matrix includes a K×N incidence matrix that includes K rows corresponding to K stationary sensor configurations and N columns corresponding to the grid elements included in the grid coverage of the respective K stationary sensor configurations.

9. The system of claim 8, wherein the greedy search maximizes an objective function $$\max_k \left( \sum_n^N M_{kn} \right)$$

over the K stationary sensor configurations to determine the optimal subset of stationary sensors.

10. The system of claim 9, wherein the objective function $M_{kn} = B_{kn} \odot (C_k \otimes W_n)$, wherein $B_{kn}$ is the incidence matrix, $C_k$ is a K×1 cost matrix, $W_n$ are the weights applied to respective grid elements, $\odot$ is a Hadamard product, and $\otimes$ is an outer product.

11. The system of claim 1, the first instructions including further instructions to download stationary sensor data from the optimal subset of stationary sensors to the second computer included in the vehicle.

12. The system of claim 11, wherein the stationary sensor data includes metadata such as bounding boxes based on objects included in the stationary sensor data.

13. A method, comprising:

determining a three-dimensional grid model of a traffic scene based on grid elements;

determining occluded grid elements by simulating fields of view based on simulated sensors included in a simulated vehicle as the simulated vehicle travels through a simulated traffic scene that includes simulated traffic;

determining weights for the grid elements of the three-dimensional grid model corresponding to priority regions and occluded grid elements;

determining grid coverage for respective ones of a plurality of stationary sensors based on the grid elements of the three-dimensional grid model;

determining a matrix based on the grid coverage of the plurality of stationary sensors; and outputting an optimal subset of stationary sensors determined based on applying a greedy search algorithm to the matrix, the weights and the plurality of stationary sensors to maximize a ratio of the grid coverage to a number of stationary sensors based on poses of the plurality of stationary sensors;

acquiring one or more images of the traffic scene with the optimal subset of stationary sensors and communicate the image data along with data describing a location and orientation of the stationary sensor to a vehicle included in the traffic scene;

determining a path for the vehicle based on the one or more images of the traffic scene; and operating the vehicle on the vehicle path by controlling vehicle powertrain, vehicle steering, and vehicle brakes.

14. The method of claim 13, further comprising determining the three-dimensional grid model by dividing a map that includes the traffic scene into a rectangular array of contiguous grid elements and determining an elevation for respective ones of the grid elements.

15. The method of claim 13, wherein the elevations are determined based on one or more of satellite lidar data or airborne lidar data.

16. The method of claim 13, further comprising determining the occluded grid elements based on the simulated traffic corresponding to typical traffic observed at one or more different times of day.

17. The method of claim 13, wherein the priority regions include one or more of a pedestrian walkway, a loading zone, and a bus stop.

18. The method of claim 13, wherein the plurality of stationary sensors are respectively mounted on one or more of a pole, a building, or a structure such that fields of view of the plurality of stationary sensors include portions of the traffic scene.

19. The method of claim 13, further comprising determining the grid coverage for respective ones of the plurality of stationary sensors based on viewshed analysis of the respective stationary sensors to the grid elements of the three-dimensional grid model.

20. The method of claim 13, wherein the matrix includes a K×N incidence matrix that includes K rows corresponding to K stationary sensor configurations and N columns corresponding to the grid elements included in the grid coverage of the respective K stationary sensor configurations.

* * * * *